Nov. 25, 1930.  M. COLANTUONO ET AL  1,782,463
LOCK NUT
Filed Sept. 13, 1928
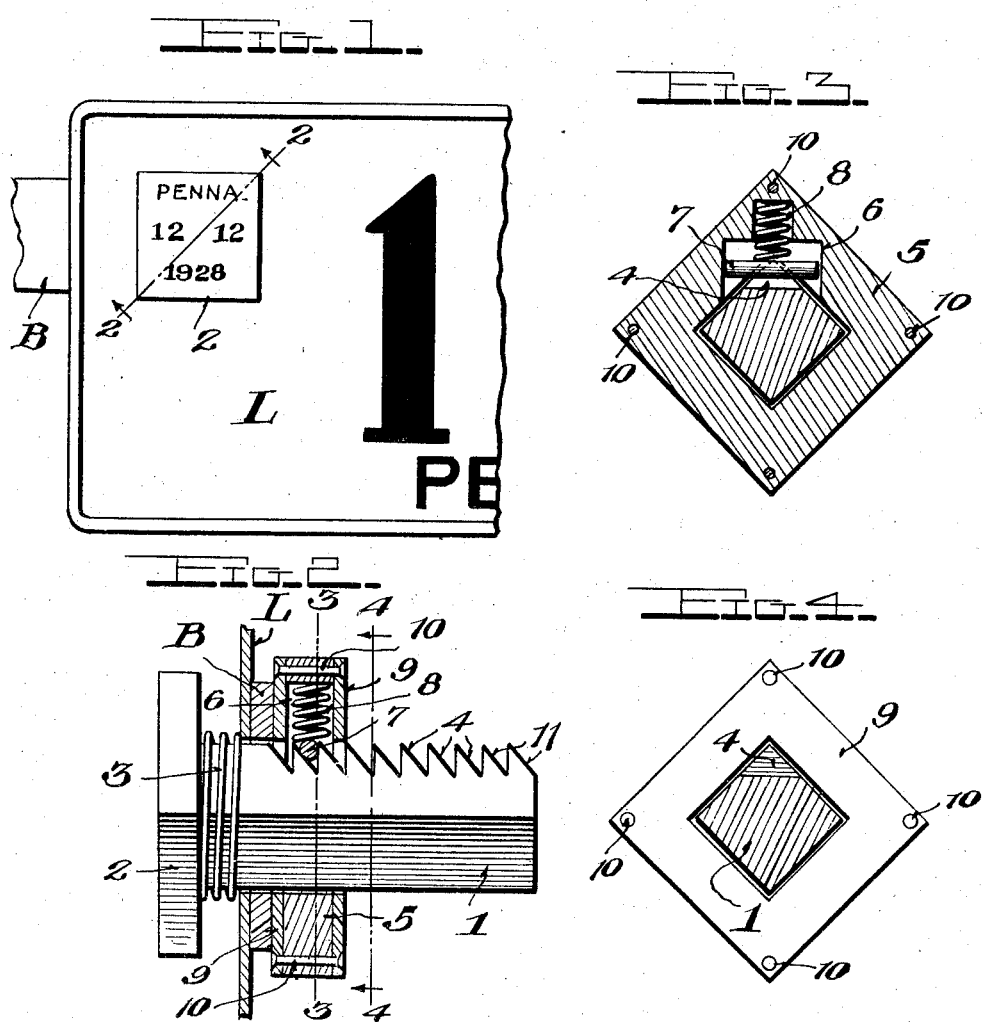
Inventors
Mauro Colantuono,
Stephen Pineno,
By Lester L. Sargent
Attorney Patented Nov. 25, 1930

1,782,463

UNITED STATES PATENT OFFICE

MAURO COLANTUONO, OF PITTSTON, AND STEPHEN PINENO, OF WYOMING, PENNSYLVANIA

LOCK NUT

Application filed September 13, 1928. Serial No. 305,701.

The object of our invention is to provide a novel type of lock nuts and especially for use in readily fastening a license plate to an automobile; and to provide a novel type of bolt for use in connection with our novel type of lock nut.

We attain these and other objects of our invention by the devices shown in the accompanying drawings, in which,—

Figure 1 is a front elevation of the invention as used in fastening a license plate onto an automobile;

Fig. 2 is a section on line 2—2 of Fig. 1, the bolt being shown in side elevation;

Fig. 3 is a section on line 3—3 of Fig. 2;

Fig. 4 is a section on line 4—4 of Fig. 2;

Fig. 5 is a section on a plan similar to that of line 2—2 of Fig. 1, but illustrating a modification of the invention; and Fig. 6 is a section on line 6—6 of Fig. 5.

Like reference characters indicate like parts in each of the several views.

Referring to the accompanying drawings, we provide a bolt 1 having a head 2, on the face of which the license number and other data, such as the number and year, may be printed, if desired, as shown in Fig. 1. The bolt 1 is provided with notches 4 along one of its angular edges, as shown in Fig. 2. These notches have upwardly slanting outer faces 11 and inner faces parallel with the head of the bolt as illustrated in Fig. 2.

We provide a nut comprising a body 5 having a recess 6 opening out of the preferably unthreaded central aperture and within which is mounted a spring 8 and a bar or pawl 7 which is of suitable size to engage in any of the notches 4 of the bolt 1. We provide suitable plates 9 fastened on either side of the recessed body 5 by suitable rivets 10 to hold the spring 8 and bar or pawl 7 seated within the recess, as shown in Fig. 2. We provide a suitable coil spring 3 encircling the bolt 1 and seated adjacent the head 2 to function as a buffer between the head 2 and the license plate L, as shown in Figs. 2 and 5.

In operation the lock nut is inserted over the bolt, with the bar or pawl 7 resiliently engaging one of the notches 4 until the nut contacts with the bar B against which the license plate L is mounted and through which the bolt 1 is inserted. The spring 3 functions as a buffer element between the license plate L and the head 2 of the bolt.

Referring to Figs. 5 and 6, there is illustrated a modification of our invention in which a recess $6^a$ is provided in a lock nut $5^a$ of one piece. We provide a spring $8^a$ engaging a suitable bar or pawl $7^a$ which seats in any of the annular notches or recessed portions of the bolt $1^a$ as shown in Figs. 5 and 6. The operation of the lock nut shown in Figs. 5 and 6 is the same as the form shown in Figs. 1 to 4, the nut itself, however, being of integral construction and the pawl $7^a$ being of different shape.

It is within the contemplation of our invention to provide any desired printing on the head 2 of the bolt 1 should such printing be desired.

It is also within the contemplation of our invention to utilize either form of lock nut with either of the forms of bolts illustrated in Figs. 2 and 5 of the accompanying drawings.

Having thus described our invention, we claim:

1. A lock nut comprising an apertured body having a recess therein communicating with the aperture, a pawl mounted in the recess, a spring engaging the pawl, and plates riveted to the body portion to form the completed lock nut.

2. A lock nut comprising an apertured body having a recess therein communicating with the aperture, a pawl mounted in the recess, a spring engaging the pawl, plates riveted to the body portion to form the completed lock nut, and a racked bolt with the racked portion of which the pawl is engageable.

3. A lock nut comprising an apertured body having a recess therein communicating with the aperture, a pawl mounted in the recess, a spring engaging the pawl, plates riveted to the body portion to form the completed lock nut, a racked bolt with the racked portion of which the pawl is engageable, a plate having an aperture therein to permit the bolt to pass through same, the lock nut being affixed to said plate and having its bolt aperture aligned with the aperture of the said plate, and a spring interposed between the outer face of the plate and the back of the head of the bolt to hold the bolt in locked position.

MAURO COLANTUONO.
STEPHEN PINENO.